United States Patent [19]

Kindl et al.

[11] 4,425,061

[45] Jan. 10, 1984

[54] TOOL SETTING DEVICE FOR MACHINING CENTER

[75] Inventors: George F. Kindl, Newington; Orean E. Michaud, Bristol, both of Conn.

[73] Assignee: Colt Industries Operating Corp, West Hartford, Conn.

[21] Appl. No.: 302,250

[22] Filed: Sep. 14, 1981

[51] Int. Cl.³ .................. B23B 49/00; B23B 39/00
[52] U.S. Cl. .................................... 408/16; 340/680; 340/825.23; 408/6; 408/13; 409/208; 409/210; 409/214; 409/218
[58] Field of Search ............... 408/13, 6, 16; 409/204, 409/207, 208, 209, 210, 214, 218; 33/185 R; 340/680, 825.23, 870.29

[56] References Cited

U.S. PATENT DOCUMENTS

| | | | |
|---|---|---|---|
| 2,129,049 | 9/1938 | Doran | 409/210 X |
| 2,850,807 | 9/1958 | Gasper | 33/185 R |
| 2,901,927 | 9/1959 | Morgan | 408/13 X |
| 3,113,807 | 12/1963 | Polidor | 308/6 R |
| 3,143,041 | 8/1964 | Namenyi-Katz | 409/218 |
| 3,171,301 | 3/1965 | Knosp | 409/214 X |
| 3,499,226 | 3/1970 | Hopkins | 33/185 R X |
| 3,524,130 | 8/1970 | Asmanse . | |
| 3,552,027 | 1/1971 | Jacobsen | 33/185 R |
| 3,571,834 | 3/1971 | Mathias | 408/13 X |
| 3,684,939 | 8/1972 | Perry | 33/185 R X |
| 3,704,641 | 12/1972 | Rhoades . | |
| 3,724,084 | 3/1973 | McNeece | 33/185 R |
| 4,016,784 | 4/1977 | Brown . | |
| 4,018,113 | 4/1977 | Blazenin et al. | 409/218 X |
| 4,142,296 | 3/1979 | Miller | 33/185 R X |
| 4,326,824 | 4/1982 | Lasermann et al. | 408/13 X |
| 4,334,363 | 6/1982 | Stegemeyer et al. | 33/185 R |

Primary Examiner—Francis S. Husar
Assistant Examiner—Steven B. Katz
Attorney, Agent, or Firm—Radford W. Luther; Richard A. Dornon

[57] ABSTRACT

A tool setting device for a machine tool (10) having a numerical control (22) includes a gage unit (24) with a frame (26) adapted to be secured upon a slide (20) of the machine tool. A photodetector, which includes a source (96) and a receiver (98), is mounted upon the frame for generating a first signal indicating the arrival of the tip of a tool (18). A slide (64) mounted upon the frame carries an engagement head (38) adapted to be contacted and displaced by the tool tip. An LVDT (60) is mounted upon the frame in proximity to the engagement head for sensing its axial displacements. A control meter relay (86,88) is operatively connected to the LVDT and generates a second signal after initial displacement of the engagement head and a third signal after displacement of the engagement head to a reference position. The numerical control is adapted to reduce the relative velocity between the tool tip and the frame after generation of the first signal and to further reduce the relative velocity after generation of the second signal. The numerical control samples the reference position of the tool tip after generation of the third signal. The various signals are also capable of illuminating lights (R,G,A) for facilitating manual tool setting by an operator.

4 Claims, 12 Drawing Figures

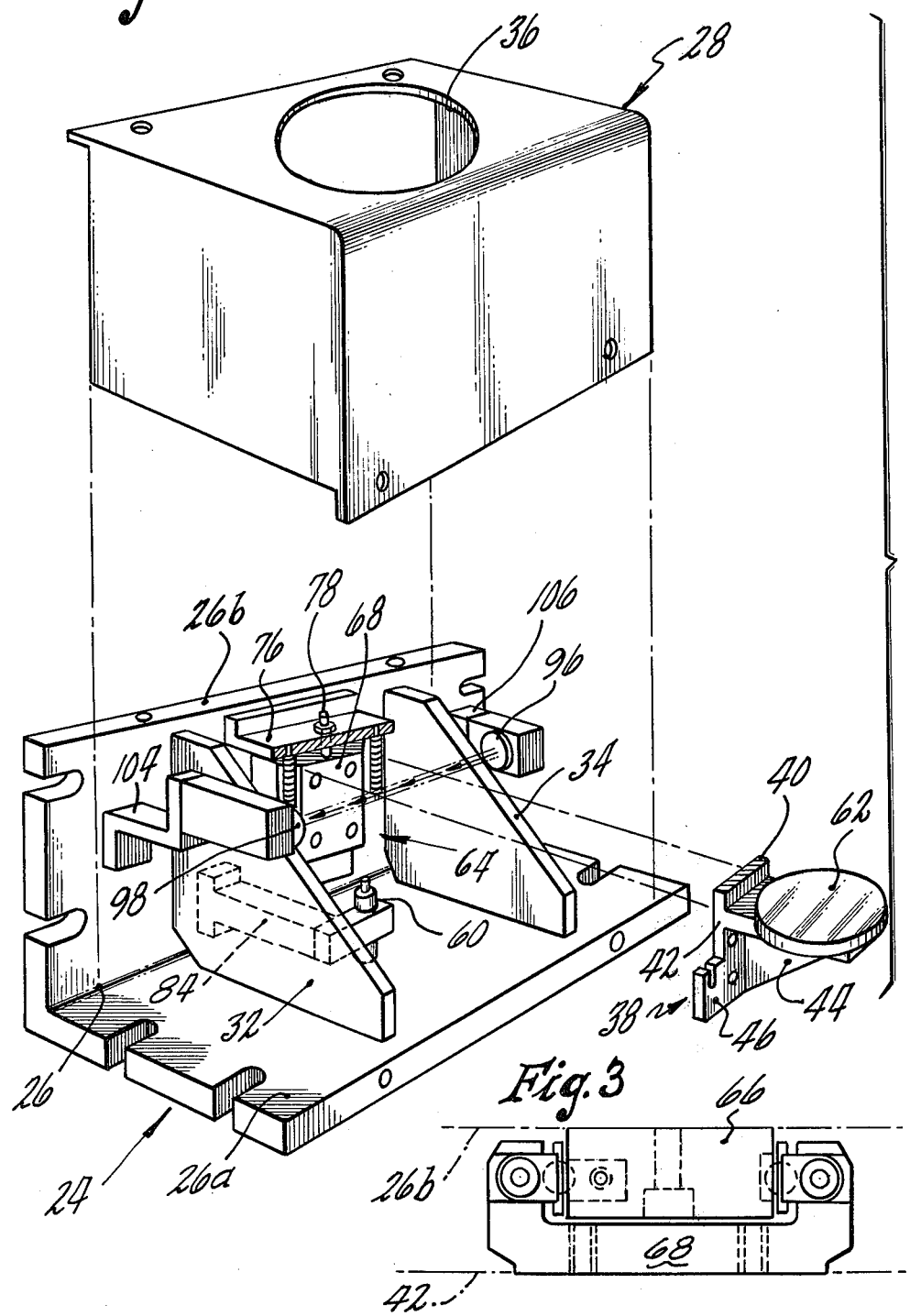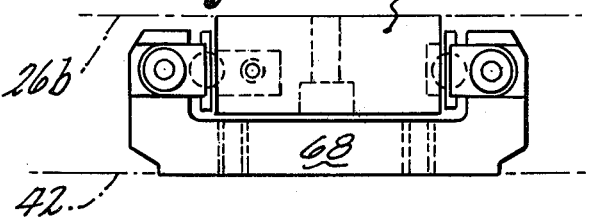

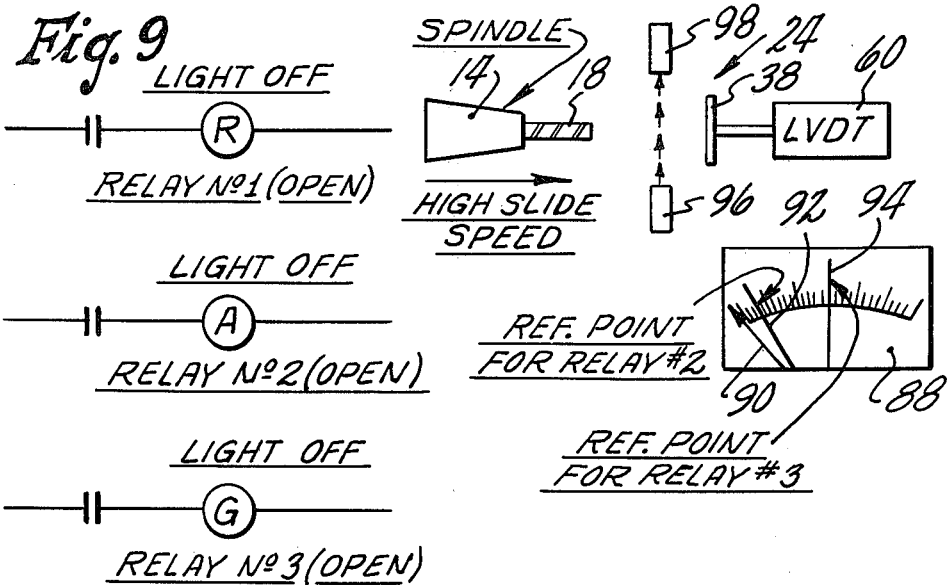

TOOL SETTING DEVICE FOR MACHINING CENTER

TECHNICAL FIELD

This invention relates to tool setting devices for a numerically controlled machine tool which establishes a reference position of the cutting tool tip.

BACKGROUND ART

It is common practice to establish the position of a tool mounted in the spindle of a machining center by precisely positioning the cutting tool tip with respect to the tool holder. Assuming that a large number of tools are to be employed in a machining operation, such a tool setting procedure can become an onerous and time-consuming task. The prior art has recognized the need for some means to automatically establish the reference position of the tip or edge of a cutting tool when it is mounted in a machine. Examples of such tool setting devices may be founded in U.S. Pat. Nos. 3,143,041; 3,524,130; 3,704,641.

U.S. Pat. No. 3,524,130 shows a non-contact tool setting device while the other patents show contact tool setting devices. A disadvantage of tool setting devices of the above-noted patents is that there is no provision for efficiently controlling the velocity of the tool with respect to the tool setting device to insure rapid relative motion until the tool is proximate the setting device and thereafter a slower speed to prevent damaging a fragile and precisely contoured tool tip and provide for a more accurate reading. In order to provide for a rapid initial relative velocity in such tool setting devices, approximate information on tool position must be known. In addition, prior art tool setting devices which have incorporated linear variable displacement transducers have not included slide mounted engagement heads or members attached to the core rods so as not to impose any lateral forces on the core rods.

DISCLOSURE OF THE INVENTION

The invention provides a tool setting device having a linear variable displacement transducer which overcomes the aforementioned drawbacks in that it incorporates a photodetector to reduce relative velocity between the tool tip and the engagement head just prior to contact, thereby permitting a high initial velocity and an expedited tool setting operation without prior knowledge of tool position. In addition, a tool setting device of the invention is advantageous in that it provides for a still further reduction in relative velocity to facilitate a more accurate reading after a tool tip has contacted and slightly displaced the engagement head. In a tool setting device according to the invention, the core and core rod of the displacement transducer are not subjected to slide loads since the engagement head is slide mounted.

Accordingly, it is a primary object of the invention to provide a tool setting device for a machining center.

Another object is to provide a tool setting device for a machining center which permits effectuation of an expedited tool setting operation.

These and other objects and advantages of the invention will become more readily apparent from the following detailed description when taken in conjunction with the accompanying drawings, in which:

BRIEF DESCRIPTION OF DRAWINGS

FIG. 2 is an exploded perspective view of the slide mounted gage unit showing the various components thereof.

FIG. 3 is a top view of the slide assembly, per se.

FIGS. 9–12, are progressive schematic views depicting the various stages of a tool setting operation.

BEST MODE OF CARRYING OUT THE INVENTION

Figure 1:
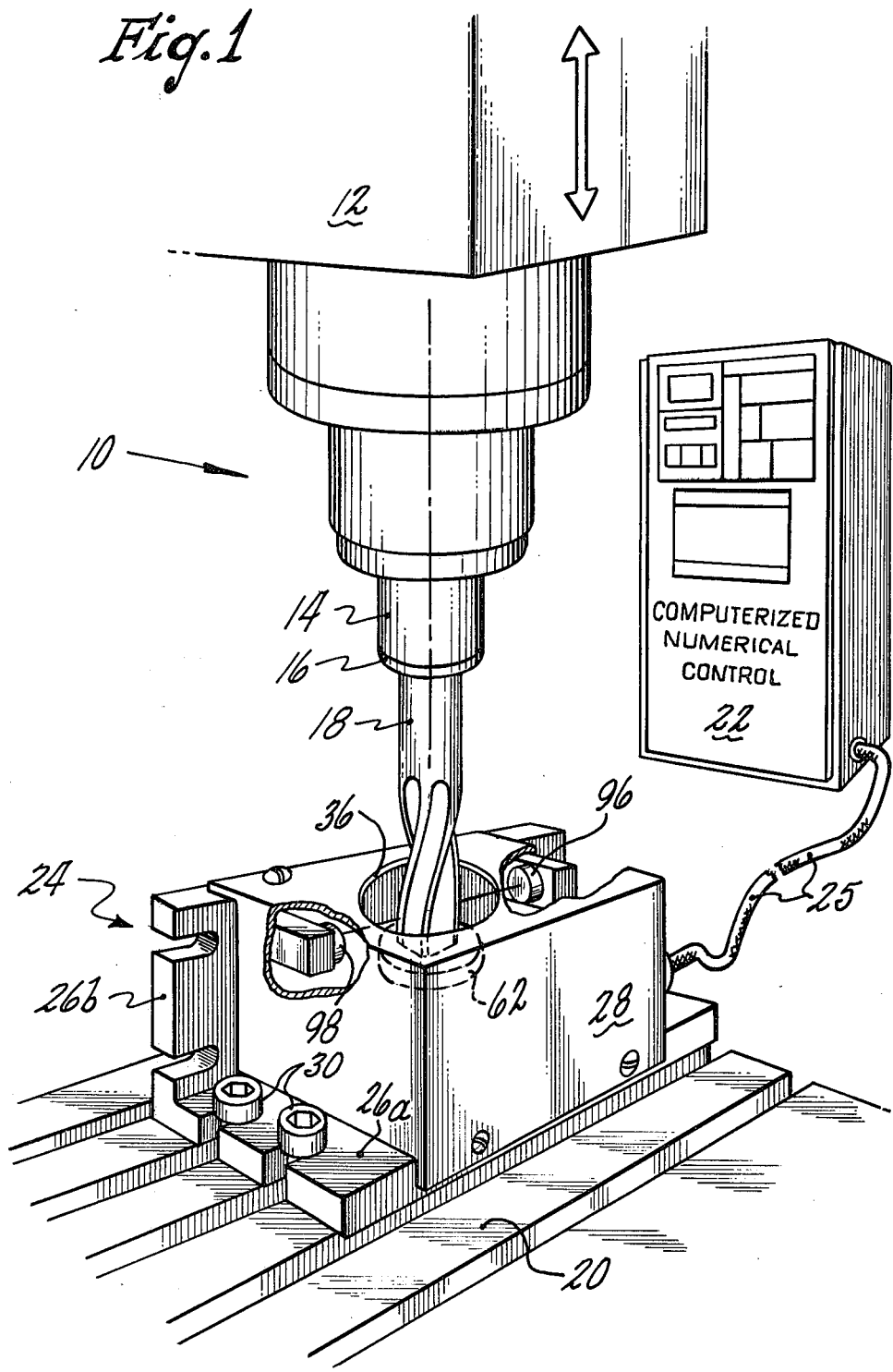
FIG. 1 is a perspective view of a vertical machining center having a tool setting device of the invention with the gage unit thereof mounted upon the workslide.

Referring to FIG. 1, there is shown a tool setting device of the invention associated with a vertical machining center 10. The machining center 10 is of conventional design and incorporates a vertically movable head 12 with a spindle 14 mounted for rotation therein. In the spindle 14 is mounted a holder 16 for the tool 18 which is secured thereby. A slide 20 adapted to support a workpiece (not shown) is mounted for horizontal movement along two axes by means not shown. The respective velocities and positions of the head 12 and the slide 20 and the spindle RPM are controlled by a CNC (computerized numerical control) unit 22.

The tool setting device of FIG. 1 incorporates a gage unit, generally shown at 24, mounted upon the slide 20, whereby it may sense the vertical position of a tool tip. Signals from the gage unit 24 are transmitted to the CNC control 22 via a cable 25. Certain elements of the tool setting device are located in the CNC unit 22 and are adapted to command certain velocities of the head 12 and sampling of head position.

With reference to FIG. 2, the gage unit includes an L-shaped frame 26 and a cover 28 shown removed from the base. The edges of the frame are suitably notched whereby it may be mounted upon the slide 20 by means of bolts 30 (FIG. 1) inserted in the T-slots in the slide. A floor section 26a and a vertical wall section 26b of the frame are secured together by vertically extending plates 32 and 34 to which each is respectively attached. The cover 28, which is adapted to be bolted upon the frame 26, minimizes exposure of the gaging elements to dirt or other contaminants. The top of the cover has an aperture 36 formed therein for permitting entry of a tool into the gage unit.

Figure 4:
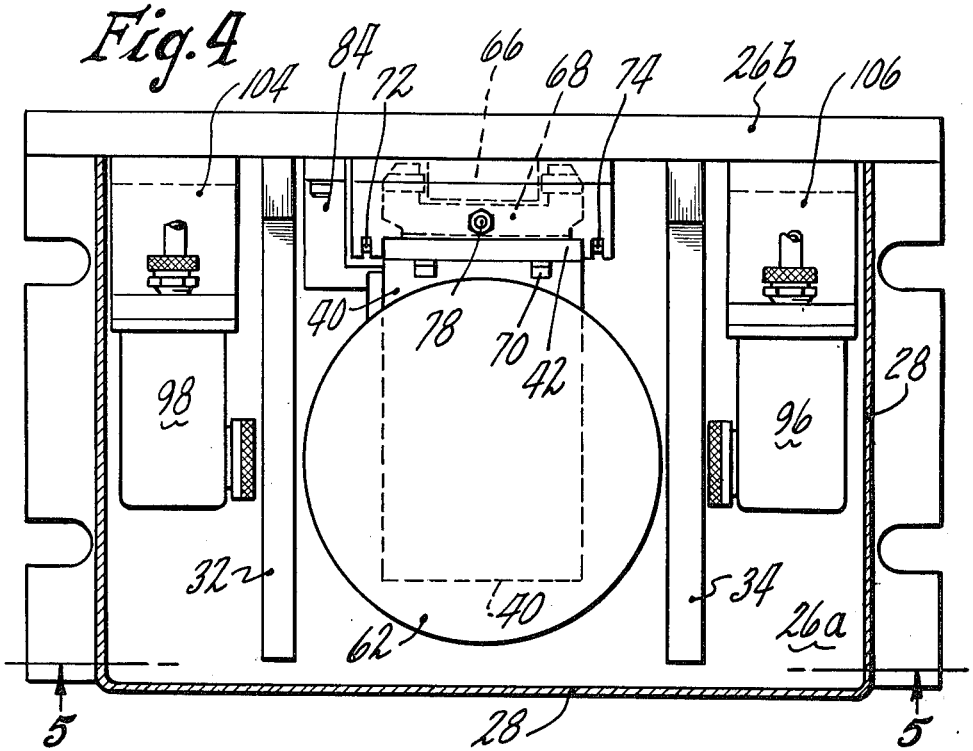
FIG. 4 is top plan view of the gage unit, with the cover partly in section.

Turning to FIGS. 3–6, with continued reference to FIG. 2, the detailed construction of the gage unit may best be appreciated. The tip of a tool entering the aperture 36 contacts an engagement head 38. Engagement head 38 is formed in an L-shape with upper and lower legs 40 and 42 respectively. A stiffening web 44 is interposed between the two legs and flanges 46 and 48 are provided on the leg 42 for mounting pins 50 and 52 which serve as attachment locations for springs 54 and 56. As best shown in FIG. 4, a metal strip 58 is attached to the side of the leg 40 for attachment to a portion of an LVDT (linear variable differential transformer), generally designated 60, which constitutes part of a position transducer. A disc 62, fixedly secured to the upper surface of the leg 40 defines the tool tip contacting surface of the engagement head 38.

The head 38 can only undergo guided axial movement and cannot be laterally displaced such as could possibly be occasioned, for example by tool points contacting locations other than at the center of the disc 62. Extreme accurate linear motion is imposed upon the head by a precision ball slide assembly, generally shown at 64, which has a base plate 66 and a sliding member 68. A top view of the slide assembly, per se, is shown in FIG. 3 and a more detailed description thereof may be found in U.S. Pat. No. 3,113,807. The leg 42 of the head 38 is attached to the sliding member 68 by screws 78, and the base plate 66 is bolted onto the vertical wall section 26b of the frame.

The extension springs 54 and 56 have their respective opposite ends hooked over pins 72 and 74 of a bracket 76 connected to the wall section 26b. The bracket 76 incorporates a stop in the form of a screw 78 which limits the spring urged upward travel of the sliding member 68, and hence, the head 38. A tool entering the aperture 36 displaces the head 38 against the bias of the springs 54 and 56; conversely, a tool moving upwardly through the aperture permits the head to return to its uppermost or at rest position wherein the sliding member 68 engages the stop 78.

Figure 5:
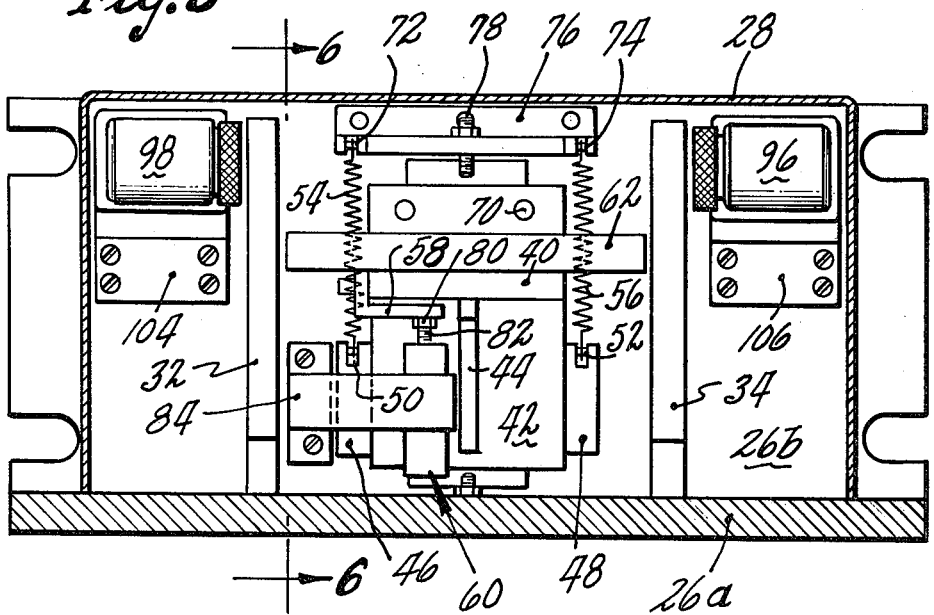
FIG. 5 is a front elevational view of the gage unit, with the cover partly in section, taken along the line of 5—5 of FIG. 4.
Figure 6:
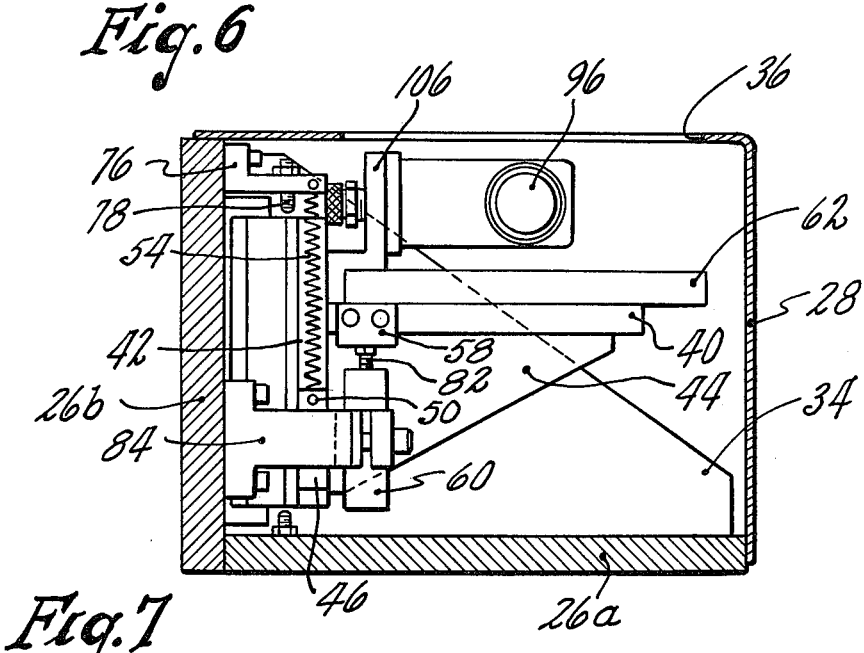
FIG. 6 is a sectional side elevational view of the gage unit, taken along the line 6—6 of FIG. 5.

As best shown in FIG. 5, the LVDT 60 has a nut 80 on the end of its core rod 82 which is adapted to engage the metal strip 58 of the head 38, thereby to displace the core. The LVDT 60 is of conventional design and embodies a signal conditioning network. The LVDT 60 is mounted in an L-shaped bracket 84 attached to the wall section 26b. The output signal of the signal conditioning network is applied to a conventional neter relay (FIG. 8) which embodies a meter control package 86 and a meter 88. The control meter relay forms another part of the position transducer. In the meter 88, a vane attached to a moving coil interrupts a light beam as the indicating pointer 90 passes a first set pointer 92. This interruption changes the resistance of a photoconductive cell attached to the set pointer, switching the circuit in the control package which energizes or de-energizes an output relay. A second set pointer 94 functions in a similar manner to control another output relay. Both set pointers are, of course, fully adjustable over the range of the meter scale.

As shown in FIGS. 1-2 and 4-6 a photodetector is provided to sense the arrival of a tool and generate a signal upon such occurrence, whereby the slide speed may be reduced to such a velocity that the ensuing gentle contact between the tip of the tool and the engagement head will not beget any tip damage. The photodetector is of the usual design and embodies a light source 96 and a receiver 98. The photodetector source 96 and receiver 98 are connected to a power supply 100 (FIG. 8) which incorporates a first relay to signal a microcomputer 102 in the CNC control 22 when the light beam is broken by a tool point. As is best depicted in FIGS. 4 and 5, the source 96 and receiver 98 are adjustably mounted upon brackets 104 and 106.

Figure 7:
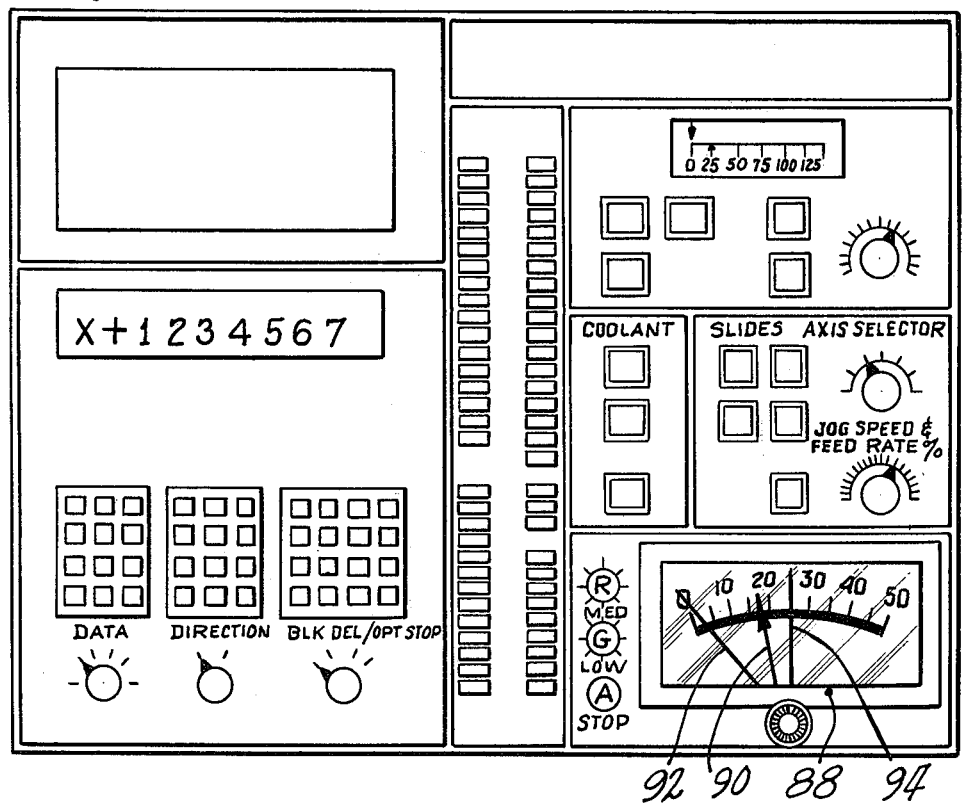
FIG. 7 is a view of the CNC control panel.

With reference to FIG. 7, there is shown the control panel for the computerized numerical control 22. The lower right hand corner of the panel displays the meter 88 alongside three colored lights designated R, G and A, which letters stand for the colors red, green and amber. The red light is controlled by Relay No. 1, the relay associated with the photodetector, and indicates when the tool tip has broken the light beam. As the red light is turned on, slide speed will be automatically reduced or should be manually reduced if an operator is controlling the tool setting operation. The green light is operated by Relay No. 2, the relay associated with the first set pointer 92; and its illumination indicates that the slide speed is being further reduced by the CNC control or should be so reduced by an operator. The red light is operated by the relay associated with the second set pointer 94. As soon as the light comes on the reading of slide position will be automatically taken and the slide stopped. If tools are being manually set, the slide will be stopped and moved in the opposite direction until the indicating pointer 90 is aligned with the second set pointer. The slide position will then be read by the operator.

Figure 8:
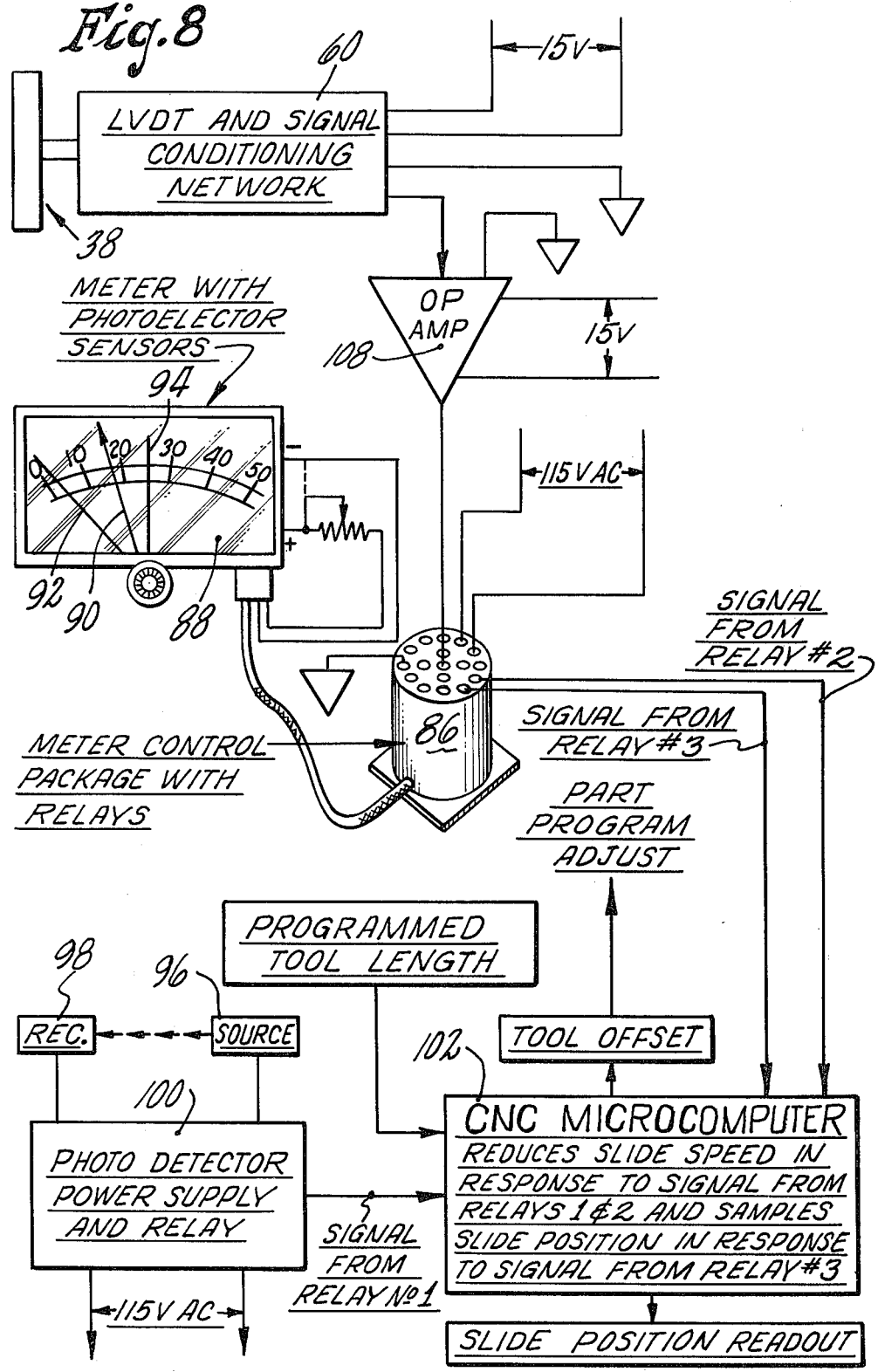
FIG. 8 is a schematic diagram of the tool setting device of FIG. 1.

A schematic diagram of the illustrated tool setting device is shown in FIG. 8. The LVDT output is applied to the input of an operational amplifier 108 which has its output connected to the meter control package 86. The signals from the relays Nos. 2 and 3 in the package 86 are directed to the CNC microcomputer 102. The CNC microcomputer 102 also receives the signal from Relay No. 1. The programmed tool length for the particular tool being measured is also directed to the microcomputer 102. The microcomputer will progressively reduce slide speed in response to the signals from relays 1 and 2 and sample slide position and terminated slide motion in response to a signal from Relay No. 3. The tool offset is then computed whereby the part program may be adjusted.

Figure 11:
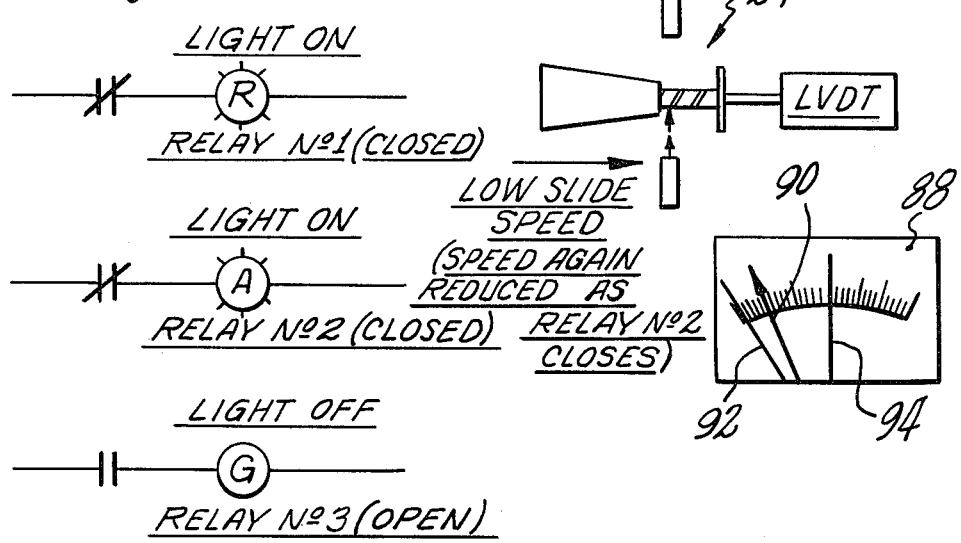
Figure 12:
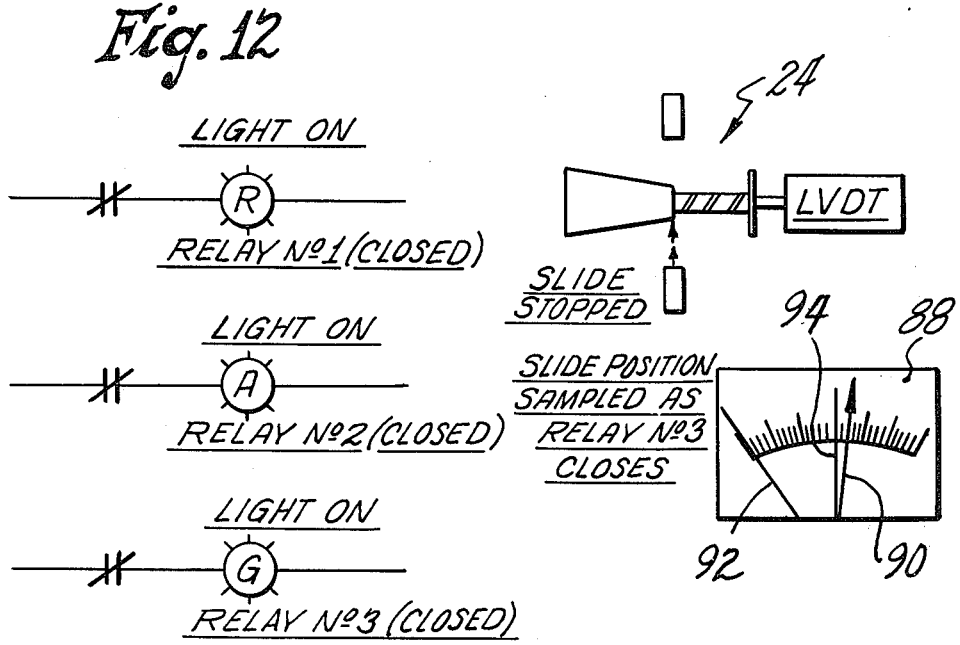

The operation of the tool setting device may best be appreciated by reference to FIGS. 9-12. In FIG. 9, the slide is moving at a relatively high speed toward the gage unit 24. The tool in the spindle has not yet broken the light beam of the photodetector and all lights are off. In FIG. 10, the light beam has just been broken, thereby closing Relay No. 1. The slide speed is reduced to a medium speed after the closing of Relay no. 1 and the red light is, of course, turned on. FIG. 11 shows that the tool tip has contacted and displaced the engagement head 38 to such an extent that the indicating pointer 90 has passed the first set pointer 92, thereby closing Relay No. 2, turning on the amber light and reducing the slide speed to a low speed. Finally, in FIG. 12, the engagement head 38 has been further displaced to a position where the indicating pointer has passed the second set pointer 94. As the second set pointer was passed, Relay No. 3 was closed, thereby illuminating the green light and commanding a slide stoppage. In addition, the slide position was sampled as Relay No. 3 was closed. Thereafter, the slide is returned to its original position, where the set tool may be removed from the spindle by a tool transfer apparatus and a new tool to be set inserted therein. It will be appreciated by those skilled in the art that a tool setting device of the invention can be employed in a fully automatic tool setting operation or a manual tool setting operation.

Obviously, many variations and modifications are possible in light of the above teachings without departing from the scope or spirit of the invention as defined by the appended claims.

We claim:

1. A tool setting device for a machine tool having a numerical control comprising:
   a frame;

a photodetector mounted on the frame for sensing the approach of a tool tip and generating a first signal;

an axially movable engagement head for contacting the tip of a tool;

a slide mounted on the frame, the engagement head being mounted upon the slide such that axial movement of the engagement head is guided thereby; and a position transducer, having a displaceable member, mounted upon the frame such that the displaceable member may be displaced by axial movement of the engagement head; the position transducer being adapted to generate a second signal as the displaceable member is initially displaced and a third signal after displacement of the displaceable member to a reference position.

2. The tool setting device of claim 1, further comprising:

three lights operatively connected to said photodetector and said position transducer to be respectively illuminated by the first, second and third signals for facilitating manual tool setting.

3. The tool setting device of claim 1, wherein the photodetector comprises:

a first relay adapted to generate the first signal; and wherein the position transducer comprises:

an LVDT; and a control meter relay operatively connected to the LVDT and having a second relay adapted to generate the second signal and a third relay adapted to generate the third signal.

4. A tool setting device in combination with a machine tool having a numerical control comprising:

a frame;

a photodetector mounted on the frame for sensing the approach of a tool tip and generating a first signal;

an axially movable engagement head for contacting the tip of a tool;

a slide mounted on the frame, the engagement head being mounted upon the slide such that axial movement of the engagement head is guided thereby; and a position transducer, having a displaceable member, mounted upon the frame such that the displaceable member may be displaced by axial movement of the engagement head; the position transducer being adapted to generate a second signal as the displaceable member is initially displaced and a third signal after displacement of the displaceable member to a reference position; and wherein the numerical control comprises:

means responsive to said first, second and third signals to reduce the relative velocity between the tool and the frame after generation of said first signal, to further reduce the relative velocity between the tool and the frame after generation of said second signal, and to sample the reference position of the tip of the tool after generation of said third signal.

* * * * *